(12) United States Patent
Yoshikawa et al.

(10) Patent No.: US 11,994,709 B2
(45) Date of Patent: May 28, 2024

(54) OPTICAL MEMBER, AND BACKLIGHT UNIT AND IMAGE DISPLAY DEVICE USING SAID OPTICAL MEMBER

(71) Applicant: NITTO DENKO CORPORATION, Ibaraki (JP)

(72) Inventors: Takahiro Yoshikawa, Ibaraki (JP); Daisuke Hattori, Ibaraki (JP); Ryota Morishima, Ibaraki (JP); Atsushi Kishi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/914,043

(22) PCT Filed: Mar. 25, 2021

(86) PCT No.: PCT/JP2021/012444
§ 371 (c)(1),
(2) Date: Sep. 23, 2022

(87) PCT Pub. No.: WO2021/193789
PCT Pub. Date: Sep. 30, 2021

(65) Prior Publication Data
US 2023/0152509 A1    May 18, 2023

(30) Foreign Application Priority Data
Mar. 26, 2020 (JP) .................................. 2020-055923

(51) Int. Cl.
*F21V 8/00* (2006.01)
(52) U.S. Cl.
CPC .................................. *G02B 6/0055* (2013.01)

(58) Field of Classification Search
CPC ...... G02B 6/0055; G02B 6/0065; G02B 1/14; G02B 6/0035; F21S 2/00; G02F 1/1336; F21Y 2105/00; F21Y 2115/10
See application file for complete search history.

(56) References Cited

U.S. PATENT DOCUMENTS

| | | | |
|---|---|---|---|
| 10,215,356 B2 * | 2/2019 | Lee | F21S 43/14 |
| 10,241,236 B2 * | 3/2019 | Takada | B32B 23/08 |

(Continued)

FOREIGN PATENT DOCUMENTS

| | | |
|---|---|---|
| EP | 3 382 446 A1 | 10/2018 |
| JP | 10-62626 A | 3/1998 |

(Continued)

OTHER PUBLICATIONS

International Search Report dated May 25, 2021, issued in counterpart International Application No. PCT/JP2021/012444 (2 pages).

(Continued)

*Primary Examiner* — Peggy A Neils
(74) *Attorney, Agent, or Firm* — WHDA, LLP

(57) ABSTRACT

Provided is an optical member, which is suppressed from causing a reduction in display quality due to wear or a flaw resulting from its vibration while maintaining the excellent characteristics of its low-refractive index layer. The optical member includes: a light guide plate having an end surface that light from a light source enters and an emitting surface from which the entered light is emitted; and a reflective plate bonded to a side of the light guide plate opposite to the emitting surface via a double-sided pressure-sensitive adhesive film. The double-sided pressure-sensitive adhesive film includes a first pressure-sensitive adhesive layer, a low-refractive index layer, and a second pressure-sensitive adhesive layer from the light guide plate side. The optical member further includes a surface-treated layer formed on a (Continued)

side of the reflective plate opposite to the double-sided pressure-sensitive adhesive film.

15 Claims, 1 Drawing Sheet

(56) References Cited

U.S. PATENT DOCUMENTS

| | | | | |
|---|---|---|---|---|
| 2006/0268572 A1* | 11/2006 | Bessho | ................ | G02B 6/0091 |
| | | | | 362/609 |
| 2020/0116921 A1 | 4/2020 | Hattori et al. | | |
| 2020/0225402 A1* | 7/2020 | Ihas | ..................... | G02B 6/0046 |

FOREIGN PATENT DOCUMENTS

| | | |
|---|---|---|
| JP | 2002-190209 A | 7/2002 |
| JP | 2013-232406 A | 11/2013 |
| JP | 2014-107028 A | 6/2014 |
| JP | 2018-124409 A | 8/2018 |
| WO | 2016/042992 A1 | 3/2016 |
| WO | 2019/151073 A1 | 8/2019 |

OTHER PUBLICATIONS

Extended (Supplementary) European Search Report dated Feb. 15, 2024, issued in counterpart EP application No. 21775405.0. (7 pages).

* cited by examiner

OPTICAL MEMBER, AND BACKLIGHT UNIT AND IMAGE DISPLAY DEVICE USING SAID OPTICAL MEMBER

TECHNICAL FIELD

The present invention relates to an optical member, and a backlight unit and an image display apparatus each using the optical member.

BACKGROUND ART

In the lamination of a light guide plate and a peripheral optical member (e.g., a reflective plate, a diffusing plate, a prism sheet, or a light extraction film) in an optical apparatus in which light is extracted with the light guide plate (e.g., an image display apparatus or a lighting apparatus), a technology including performing the lamination via a low-refractive index layer has been known. It has been reported that according to such technology, the intermediation of the low-refractive index layer improves light utilization efficiency as compared to that in the case where the lamination is simply performed with a pressure-sensitive adhesive alone. The use of the low-refractive index layer in the integration of such optical members has been expected in on-vehicle applications and/or amusement applications (e.g., an arcade game machine, and playing machines, such as a pachinko machine and a slot machine). However, the integration of the optical members (e.g., a light guide plate and a reflective plate) in the on-vehicle applications and/or the amusement applications may reduce display quality owing to wear or a flaw between the optical members and/or between each of the optical members and a casing resulting from vibration at the time of the use of such optical member.

CITATION LIST

Patent Literature

[PTL 1] JP 10-62626 A

SUMMARY OF INVENTION

Technical Problem

The present invention has been made to solve the above-mentioned conventional problem, and a primary object of the present invention is to provide an optical member, which is suppressed from causing a reduction in display quality due to wear or a flaw resulting from its vibration while maintaining the excellent characteristics of its low-refractive index layer.

Solution to Problem

According to one embodiment of the present invention, there is provided an optical member, including: a light guide plate having an end surface that light from a light source enters and an emitting surface from which the entered light is emitted; and a reflective plate bonded to a side of the light guide plate opposite to the emitting surface via a double-sided pressure-sensitive adhesive film. The double-sided pressure-sensitive adhesive film includes a first pressure-sensitive adhesive layer, a low-refractive index layer, and a second pressure-sensitive adhesive layer from a light guide plate side. The optical member further includes a surface-treated layer formed on a side of the reflective plate opposite to the double-sided pressure-sensitive adhesive film.

In one embodiment, the surface-treated layer has a dynamic friction coefficient of 1.0 or less.

In one embodiment, the surface-treated layer is a hard coat layer having a pencil hardness of H or more. In one embodiment, the surface-treated layer further includes an outermost layer containing fluorine on a surface of the hard coat layer opposite to the reflective plate.

According to another embodiment of the present invention, there is provided a backlight unit. The backlight unit includes: the above-mentioned optical member; and a light source, wherein the light source is arranged so as to face the end surface of the light guide plate.

According to still another embodiment of the present invention, there is provided an image display apparatus. The image display apparatus includes: the above-mentioned backlight unit; and an image display panel arranged on an emitting surface side of the light guide plate.

Advantageous Effects of Invention

According to the present invention, in the optical member in which the light guide plate and the reflective plate are integrated with each other via the double-sided pressure-sensitive adhesive film including the low-refractive index layer, the predetermined surface-treated layer is arranged on the surface of the reflective plate. Thus, there can be realized the optical member, which is suppressed from causing a reduction in display quality due to wear or a flaw resulting from its vibration while maintaining the excellent characteristics of the low-refractive index layer.

DESCRIPTION OF EMBODIMENTS

Embodiments of the present invention are described below. However, the present invention is not limited to these embodiments.

A. Overall Configuration of Optical Member

Figure 1:
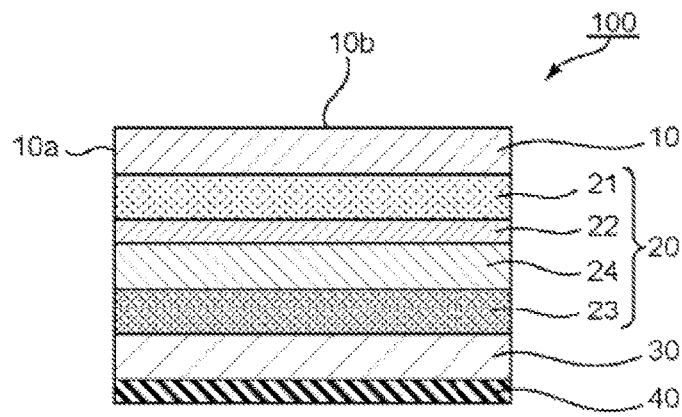
FIG. 1 is a schematic sectional view of an optical member according to one embodiment of the present invention.

FIG. 1 is a schematic sectional view of an optical member according to one embodiment of the present invention. An optical member 100 of the illustrated example includes a light guide plate 10 and a reflective plate 30 bonded to the light guide plate 10 via a double-sided pressure-sensitive adhesive film 20. The double-sided pressure-sensitive adhesive film 20 includes a first pressure-sensitive adhesive layer 21, a low-refractive index layer 22, and a second pressure-sensitive adhesive layer 23 from the light guide plate 10 side. Practically, a substrate 24 is arranged between the low-refractive index layer 22 and the second pressure-sensitive adhesive layer 23. More specifically, the low-refractive index layer 22 may be formed on the surface of the substrate 24, and the first pressure-sensitive adhesive layer 21 and the second pressure-sensitive adhesive layer 23 may be arranged on both the sides of the laminate of the substrate 24 and the low-refractive index layer 22. The optical member 100 further includes a surface-treated layer 40 formed on the side of the reflective plate 30 opposite to the double-sided pressure-sensitive adhesive film 20.

The light guide plate 10 has an end surface 10*a* that light from a light source 50 enters and an emitting surface 10*b* from which the entered light is emitted. That is, the light guide plate 10 is typically an edge light system in which the light enters from the end surface 10*a*. More specifically, the light guide plate 10 guides the light that has entered the end surface 10*a* from the light source 50 toward an end portion opposite to the end surface 10*a* while subjecting the light to a reflective action or the like therein, and in the light guide process, the plate gradually emits the light from the emitting surface 10*b*. An emission pattern is typically arranged on the emitting surface 10*b*. The emission pattern is, for example, an uneven shape. Further, a light extraction pattern is typically arranged on the surface of the light guide plate opposite to the emitting surface. The light extraction pattern is, for example, a white dot. Any appropriate light guide plate may be used as the light guide plate. Any appropriate material may be used as a material for forming the light guide plate as long as the light applied from the light source can be efficiently guided. Examples of the material for forming the light guide plate include an acrylic resin such as polymethyl methacrylate (PMMA), a polycarbonate (PC) resin, a polyethylene terephthalate (PET) resin, a styrene resin, and glass.

Any appropriate reflective plate may be used as the reflective plate. For example, the reflective plate may be a mirror-surface reflective plate, or may be a diffusing reflective plate. Specific examples of the reflective plate include: a resin sheet having a high reflectance (e.g., an acrylic plate); a metal thin plate or metal foil made of aluminum, stainless steel, or the like; a deposited sheet obtained by depositing aluminum, silver, or the like from the vapor onto a substrate such as a resin film made of polyester or the like; a laminate of a substrate such as a resin film made of polyester or the like and metal foil made of aluminum or the like; and a resin film having formed therein voids.

The double-sided pressure-sensitive adhesive film and the surface-treated layer for forming the optical member are described in detail below. Description for the light guide plate and the reflective plate except the foregoing is omitted because configurations well-known in the art may be adopted for the plates.

B. Double-Sided Pressure-Sensitive Adhesive Film
B-1. Outline of Double-Sided Pressure-Sensitive Adhesive Film As described in the section A, the double-sided pressure-sensitive adhesive film includes the first pressure-sensitive adhesive layer 21, the low-refractive index layer 22, and practically, the substrate 24, and the second pressure-sensitive adhesive layer 23 from the light guide plate 10 side. The porosity of the low-refractive index layer 22 is, for example, 40 vol % or more. The storage modulus of elasticity of the first pressure-sensitive adhesive layer at 23° C. is, for example, from $1.0 \times 10^5$ (Pa) to $1.0 \times 10^7$ (Pa), and the storage modulus of elasticity of the second pressure-sensitive adhesive layer at 23° C. is, for example, $1.0 \times 10^5$ (Pa) or less. When the storage modulus of elasticity of the first pressure-sensitive adhesive layer adjacent to the low-refractive index layer is set to be high as described above, the pressure-sensitive adhesive of the layer can be prevented from entering the pores of the low-refractive index layer. Accordingly, the refractive index of the low-refractive index layer is maintained low, and the lowering effect can be maintained. Further, when the storage modulus of elasticity of the second pressure-sensitive adhesive layer that is the other pressure-sensitive adhesive layer is set to be low as described above, the breakage of the low-refractive index layer due to the vibration of the optical member can be suppressed. The suppressing effect on the breakage of the low-refractive index layer due to the vibration becomes particularly significant when the optical member is used in on-vehicle applications and/or amusement applications.

In one embodiment, the ratio of the thickness of the low-refractive index layer to the total thickness of the pressure-sensitive adhesive layers present in the double-sided pressure-sensitive adhesive film is, for example, from 0.10% to 5.00%, preferably from 0.11% to 4.50%, more preferably from 0.12% to 4.00%. When the thickness ratio falls within such ranges, the breakage of the low-refractive index layer due to the vibration can be more satisfactorily suppressed. More specifically, although large vibration is present not only in a longitudinal direction but also in a lateral direction in on-vehicle applications and/or amusement applications, the breakage of the low-refractive index layer particularly poor in strength in the lateral direction can be satisfactorily suppressed.

B-2. Substrate

The substrate may be typically formed of a film or plate-shaped product of a resin (preferably a transparent resin). Typical examples of such resin include a thermoplastic resin and a reactive resin (e.g., an ionizing radiation-curable resin). Specific examples of the thermoplastic resin include: a (meth)acrylic resin, such as polymethyl methacrylate (PMMA) or polyacrylonitrile; a polycarbonate (PC) resin; a polyester resin such as PET; a cellulose-based resin such as triacetyl cellulose (TAC); a cyclic polyolefin-based resin; and a styrene-based resin. Specific examples of the ionizing radiation-curable resin include an epoxy acrylate-based resin and a urethane acrylate-based resin. Those resins may be used alone or in combination thereof.

The thickness of the substrate is, for example, from 10 μm to 100 μm, preferably from 10 μm to 50 μm.

The refractive index of the substrate is preferably 1.47 or more, more preferably from 1.47 to 1.60, still more preferably from 1.47 to 1.55. When the refractive index falls within such ranges, light extracted from the light guide plate can be introduced into the image display cell without being adversely affected.

B-3. Low-Refractive Index Layer

The low-refractive index layer typically has pores therein. The porosity of the low-refractive index layer is 40 vol % or more as described above, and is typically 50 vol % or more, preferably 70 vol % or more, more preferably 80 vol % or more. Meanwhile, the porosity is, for example, 90 vol % or less, preferably 85 vol % or less. When the porosity falls within the ranges, the refractive index of the low-refractive index layer can be set within an appropriate range. The porosity is a value calculated from the value of the refractive index measured with an ellipsometer by using Lorentz-Lorenz's formula.

The refractive index of the low-refractive index layer is preferably 1.30 or less, more preferably 1.20 or less, still more preferably 1.15 or less. The lower limit of the refractive index may be, for example, 1.01. When the refractive index falls within such ranges, extremely excellent light utilization efficiency can be achieved in the laminated structure of the light guide plate and the peripheral member obtained via the optical laminate with pressure-sensitive adhesive layers on both sides. The refractive index refers to a refractive index measured at a wavelength of 550 nm unless otherwise stated. The refractive index is a value measured by a method described in [Production Example 4] in Examples below.

Any appropriate configuration may be adopted for the low-refractive index layer as long as the layer has the above-mentioned desired porosity and refractive index. The low-refractive index layer may be preferably formed through, for example, application or printing. Materials described in, for example, WO 2004/113966 A1, JP 2013-254183 A, and JP 2012-189802 A may each be adopted as a material for forming the low-refractive index layer. Specific examples thereof include: silica-based compounds; hydrolyzable silanes, and partial hydrolysates and dehydration condensates thereof; organic polymers; silanol group-containing silicon compounds; active silica obtained by bringing a silicate into contact with an acid or an ion-exchange resin; polymerizable monomers (e.g., a (meth) acrylic monomer and a styrene-based monomer); curable resins (e.g., a (meth)acrylic resin, a fluorine-containing resin, and a urethane resin); and combinations thereof. The low-refractive index layer may be formed by, for example, applying or printing a solution or a dispersion liquid of such material.

The size of each of the pores (holes) in the low-refractive index layer refers to a major axis diameter out of the major axis diameter and minor axis diameter of the pore (hole). The sizes of the pores (holes) are, for example, from 2 nm to 500 nm. The sizes of the pores (holes) are, for example, 2 nm or more, preferably 5 nm or more, more preferably 10 nm or more, still more preferably 20 nm or more. Meanwhile, the sizes of the pores (holes) are, for example, 500 nm or less, preferably 200 nm or less, more preferably 100 nm or less. The range of the sizes of the pores (holes) is, for example, from 2 nm to 500 nm, preferably from 5 nm to 500 nm, more preferably from 10 nm to 200 nm, still more preferably from 20 nm to 100 nm. The sizes of the pores (holes) may be adjusted to desired sizes in accordance with, for example, a purpose and an application.

The sizes of the pores (holes) may be quantified by a BET test method. Specifically, 0.1 g of the sample (formed pore layer) is loaded into the capillary of a specific surface area-measuring apparatus (manufactured by Micromeritics Instrument Corporation, ASAP 2020), and is then dried under reduced pressure at room temperature for 24 hours so that a gas in its pore structure may be removed. Then, an adsorption isotherm is drawn by causing the sample to adsorb a nitrogen gas, and its pore size distribution is determined. Thus, the pore sizes may be evaluated.

The haze of the low-refractive index layer is, for example, less than 5%, preferably less than 3%. Meanwhile, the haze is, for example, 0.1% or more, preferably 0.2% or more. The range of the haze is, for example, 0.1% or more and less than 5%, preferably 0.2% or more and less than 3%. The haze may be measured by, for example, such a method as described below. The haze is an indicator of the transparency of the low-refractive index layer.

The pore layer (low-refractive index layer) is cut into a size measuring 50 mm by 50 mm, and is set in a haze meter (manufactured by Murakami Color Research Laboratory Co., Ltd.: HM-150), followed by the measurement of its haze. The haze value is calculated from the following equation.

$$\text{Haze (\%)} = [\text{diffuse transmittance (\%)}/\text{total light transmittance (\%)}] \times 100(\%)$$

The low-refractive index layer having the pores therein is, for example, a low-refractive index layer having a porous layer and/or an air layer in at least part thereof. The porous layer typically contains aerogel and/or particles (e.g., hollow fine particles and/or porous particles). The low-refractive index layer may be preferably a nanoporous layer (specifically a porous layer in which the diameters of 90% or more of micropores fall within the range of from $10^{-1}$ nm to $10^3$ nm).

Any appropriate particles may be adopted as the particles. The particles are each typically formed of a silica-based compound. Examples of the shapes of the particles include a spherical shape, a plate shape, a needle shape, a string shape, and a botryoidal shape. String-shaped particles are, for example, particles in which a plurality of particles each having a spherical shape, a plate shape, or a needle shape are strung together like beads, short fiber-shaped particles (e.g., short fiber-shaped particles described in JP 2001-188104 A), and a combination thereof. The string-shaped particles may be linear or may be branched. Botryoidal-shaped particles are, for example, particles in which a plurality of spherical, plate-shaped, and needle-shaped particles aggregate to form a botryoidal shape. The shapes of the particles may be identified through, for example, observation with a transmission electron microscope.

The thickness of the low-refractive index layer is preferably from 0.2 μm to 5 μm, more preferably from 0.3 μm to 3 μm. When the thickness of the low-refractive index layer falls within such ranges, a damage-preventing effect exhibited by the present invention becomes significant. Further, the above-mentioned desired thickness ratio can be easily achieved.

As described above, the low-refractive index layer may be typically formed through application or printing. With such configuration, the low-refractive index layer can be continuously arranged by a roll-to-roll process. The low-refractive index layer may be formed on the entire surface of the substrate, or may be formed in a predetermined pattern. When the low-refractive index layer is formed in the predetermined pattern, the application is performed through, for example, a mask having the predetermined pattern. Any appropriate system may be adopted for the printing. Specifically, a printing method may be a plate printing method, such as gravure printing, offset printing, or flexographic printing, or may be a plateless printing method, such as inkjet printing, laser printing, or electrostatic printing.

An example of a specific configuration of the low-refractive index layer is described below. The low-refractive index layer of this embodiment is formed of one or a plurality of kinds of constituent units each forming a fine pore structure, and the constituent units are chemically bonded to each other through a catalytic action. Examples of the shape of each of the constituent units include a particle shape, a fiber shape, a rod shape, and a flat plate shape. The constituent units may have only one shape, or may have two or more shapes in combination. In the following description, a case in which the low-refractive index layer is a pore layer of a porous body in which the microporous particles are chemically bonded to each other is mainly described.

Such pore layer may be formed by, for example, chemically bonding the microporous particles to each other in a pore layer-forming step. In the embodiment of the present invention, the shapes of the "particles" (e.g., the microporous particles) are not particularly limited. For example, the shapes may each be a spherical shape, or may each be any other shape. In addition, in the embodiment of the present invention, the microporous particles may be, for example, sol-gel beaded particles, nanoparticles (hollow nanosilica nanoballoon particles), or nanofibers. The microporous particles each typically contain an inorganic substance. Specific examples of the inorganic substance include silicon (Si), magnesium (Mg), aluminum (Al), titanium (Ti), zinc (Zn), and zirconium (Zr). Those inorganic substances may be used alone or in combination thereof. In one embodiment, the microporous particles are, for example, microporous particles of a silicon compound, and the porous body is, for example, a silicone porous body. The microporous particles of the silicon compound each contain, for example, a pulverized body of a gel-like silica compound. In addition, another form of the low-refractive index layer having the porous layer and/or the air layer in at least part thereof is, for example, a pore layer having the following features: the layer is formed of fibrous substances such as nanofibers; and the fibrous substances are entangled with each other to form pores, thereby forming the layer. A method of producing such pore layer is not particularly limited, and is the same as that in the case of, for example, the pore layer of the porous body in which the microporous particles are chemically bonded to each other. Still another form thereof is, for example, a pore layer using hollow nanoparticles or nanoclay, or a pore layer formed by using hollow nanoballoons or magnesium fluoride. The pore layer may be a pore layer formed of a single constituent substance, or may be a pore layer formed of a plurality of constituent substances. The pore layer may include any one of the above-mentioned forms, or may include two or more of the above-mentioned forms.

In this embodiment, the porous structure of the porous body may be, for example, an open-cell structural body in which hole structures are continuous with each other. The open-cell structural body means, for example, that the hole structures are three-dimensionally continuous with each other in the silicone porous body, and can be said to be a state in which the internal pores of the hole structures are continuous with each other. When the porous body has an open-cell structure, its porosity can be increased. However, when closed-cell particles (particles each individually having a hole structure) such as hollow silica are used, an open-cell structure cannot be formed. Meanwhile, for example, when silica sol particles (pulverized products of a gel-like silicon compound that forms sol) are used, the particles each have a three-dimensional dendritic structure, and hence the dendritic particles are sedimented and deposited in a coating film (coating film of the sol containing the pulverized products of the gel-like silicon compound). Accordingly, an open-cell structure can be easily formed. The low-refractive index layer more preferably has a monolith structure in which an open-cell structure includes a plurality of pore size distributions. The monolith structure means, for example, a hierarchical structure including a structure in which nanosized fine pores are present and an open-cell structure in which the nanosized pores assemble. When the monolith structure is formed, both of film strength and a high porosity may be achieved by, for example, imparting the high porosity to the layer through use of a coarse open-cell pore while imparting the film strength thereto through use of a fine pore. Such monolith structure may be preferably formed by controlling the pore size distribution of a pore structure to be produced in the gel (gel-like silicon compound) at a stage before its pulverization into the silica sol particles. In addition, the monolith structure may be formed by, for example, controlling the particle size distribution of the silica sol particles after the pulverization to a desired size at the time of the pulverization of the gel-like silicon compound.

The low-refractive index layer contains, for example, the pulverized products of a gel-like compound as described above, and the pulverized products are chemically bonded to each other. The form of the chemical bond (chemical bonding) between the pulverized products in the low-refractive index layer is not particularly limited, and examples thereof include a cross-linking bond, a covalent bond, and a hydrogen bond.

The gel form of the gel-like compound is not particularly limited. The term "gel" generally refers to a state in which the mixture of a solvent and a solute is solidified because the solute loses its independent mobility owing to an interaction between its molecules to have a structure in which the molecules assemble. For example, the gel-like compound may be wet gel or xerogel. In general, the wet gel refers to gel which contains a dispersion medium and in which a solute has a uniform structure in the dispersion medium, and the xerogel refers to gel from which a solvent is removed, and in which a solute has a network structure having pores.

The gel-like compound is, for example, a gelled product obtained by causing a monomer compound to gel. The gel-like silicon compound is specifically, for example, a gelled product in which the molecules of a monomer silicon compound are bonded to each other, and the gelled product is more specifically, for example, a gelled product in which the molecules of the monomer silicon compound are bonded to each other by a covalent bond, a hydrogen bond, or an intermolecular force. The covalent bond is, for example, a bond formed by dehydration condensation.

The volume-average particle diameter of the pulverized products in the low-refractive index layer is, for example, 0.10 μm or more, preferably 0.20 μm or more, more preferably 0.40 μm or more. Meanwhile, the volume-average particle diameter is, for example, 2.00 μm or less, preferably 1.50 μm or less, more preferably 1.00 μm or less. The range of the volume-average particle diameter is, for example, from 0.10 μm to 2.00 μm, preferably from 0.20 μm to 1.50 μm, more preferably from 0.40 μm to 1.00 μm. The particle size distribution of the pulverized products may be measured with, for example, a particle size distribution-evaluating apparatus based on a dynamic light scattering method, a laser diffraction method, or the like, and an electron microscope, such as a scanning electron microscope (SEM) or a transmission electron microscope (TEM). The volume-average particle diameter is an indicator of a variation in particle size of the pulverized products.

The kind of the gel-like compound is not particularly limited. The gel-like compound is, for example, a gel-like silicon compound. Although description is given below by taking a case in which the gel-like compound is the gel-like silicon compound as an example, the gel-like compound is not limited thereto.

The above-mentioned cross-linking bond is, for example, a siloxane bond. Examples of the siloxane bond include such a bond T2, a bond T3, and a bond T4 as represented below. When the pore layer (low-refractive index layer) has a siloxane bond, the layer may have any one kind of those bonds, may have any two kinds of the bonds, or may have all the three kinds of the bonds. As the ratios of the T2 and the T3 out of the siloxane bonds become larger, the layer becomes richer in flexibility, and hence characteristics intrinsic to gel can be expected. Meanwhile, as the ratio of the T4 becomes larger, the film strength of the layer is more easily expressed. Accordingly, the ratios of the T2, the T3, and the T4 are preferably changed in accordance with, for example, purposes, applications, and desired characteristics.

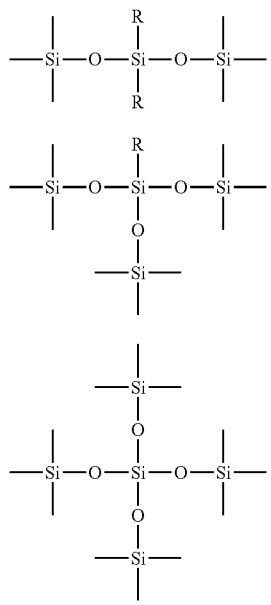

In addition, in the low-refractive index layer (pore layer), for example, silicon atoms to be incorporated preferably form a siloxane bond. As a specific example, the ratio of unbonded silicon atoms (in other words, residual silanol groups) out of all the silicon atoms in the pore layer is, for example, less than 50%, preferably 30% or less, more preferably 15% or less.

When the gel-like compound is a gel-like silicon compound, a monomer silicon compound is not particularly limited. The monomer silicon compound is, for example, a compound represented by the below-indicated formula (1). When the gel-like silicon compound is a gelled product in which the molecules of the monomer silicon compound are bonded to each other by a hydrogen bond or an intermolecular force as described above, a hydrogen bond may be formed between the molecules of the monomer represented by the formula (1) through, for example, their respective hydroxy groups.

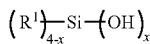 (1)

In the formula (1), X represents, for example, 2, 3, or 4, preferably 3 or 4. $R^1$ represents, for example, a linear or branched alkyl group. The group represented by $R^1$ has, for example, 1 to 6 carbon atoms, preferably 1 to 4 carbon atoms, more preferably 1 or 2 carbon atoms. Examples of the linear alkyl group include a methyl group, an ethyl group, a propyl group, a butyl group, a pentyl group, and a hexyl group, and examples of the branched alkyl group include an isopropyl group and an isobutyl group.

A specific example of the silicon compound represented by the formula (1) is a compound represented by the below-indicated formula (1') in which X represents 3. In the below-indicated formula (1'), $R^1$ is identical to that in the case of the formula (1), and represents, for example, a methyl group. When R=represents a methyl group, the silicon compound is tris(hydroxy)methylsilane. When X represents 3, the silicon compound is, for example, a trifunctional silane having 3 functional groups.

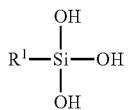 (1')

Another specific example of the silicon compound represented by the formula (1) is a compound in which X represents 4. In this case, the silicon compound is, for example, a tetrafunctional silane having 4 functional groups.

The monomer silicon compound may be, for example, a hydrolysate of a silicon compound precursor. The silicon compound precursor only needs to be capable of producing a silicon compound through, for example, hydrolysis, and is specifically, for example, a compound represented by the below-indicated formula (2).

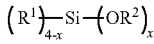 (2)

In the formula (2), X represents, for example, 2, 3, or 4, $R^1$ and $R^2$ each independently represent a linear or branched alkyl group,
$R^1$ and $R^2$ may be identical to or different from each other, when X represents 2, $R^1$s may be identical to or different from each other, and
$R^2$s may be identical to or different from each other.

X and $R^1$ are identical to, for example, X and $R^1$ in the formula (1). For example, examples of $R^1$ in the formula (1) may be cited for $R^2$.

The silicon compound precursor represented by the formula (2) is specifically, for example, a compound represented by the below-indicated formula (2') in which X represents 3. In the below-indicated formula (2'), $R^1$ and $R^2$ are each identical to that in the case of the formula (2). When $R^1$ and $R^2$ represent methyl groups, the silicon compound precursor is trimethoxy(methyl)silane (hereinafter sometimes referred to as "MTMS").

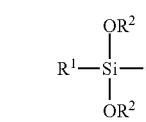 (2')

The monomer silicon compound is preferably a trifunctional silane because the silane is excellent in, for example, low-refractive index property. In addition, the monomer silicon compound is preferably a tetrafunctional silane because the silane is excellent in, for example, strength (e.g., scratch resistance). The monomer silicon compounds may be used alone or in combination thereof. For example, as the monomer silicon compound, only the trifunctional silane may be incorporated into the low-refractive index layer, only the tetrafunctional silane may be incorporated, both of the trifunctional silane and the tetrafunctional silane may be incorporated, or any other silicon compound may be further incorporated. When two or more kinds of silicon compounds are used as the monomer silicon compounds, a ratio therebetween is not particularly limited, and may be appropriately set.

An example of a method of forming such low-refractive index layer is described below.

The method typically includes: a precursor-forming step of forming a pore structure, which is a precursor of the low-refractive index layer (pore layer), on a resin film; and a cross-linking reaction step of causing a cross-linking reaction in the precursor after the precursor-forming step. The method further includes: a containing liquid-producing step of producing a containing liquid containing microporous particles (hereinafter sometimes referred to as "microporous particle-containing liquid" or simply "containing liquid"); and a drying step of drying the containing liquid. In the precursor-forming step, the microporous particles in a dried body are chemically bonded to each other to form the precursor. The containing liquid is not particularly limited, and is, for example, a suspension containing the microporous particles. In the following, a case in which the microporous particles are pulverized products of the gel-like compound, and the pore layer is a porous body (preferably a silicone porous body) containing the pulverized products of the gel-like compound is mainly described. However, even when the microporous particles are products except the pulverized products of the gel-like compound, the low-refractive index layer may be similarly formed.

According to the above-mentioned method, for example, a low-refractive index layer (pore layer) having an extremely low refractive index is formed. A reason for the foregoing is assumed to be, for example, as described below. However, the assumption does not limit the method of forming the low-refractive index layer.

The above-mentioned pulverized products are obtained by pulverizing the gel-like silicon compound, and hence a state in which the three-dimensional structure of the gel-like silicon compound before the pulverization is dispersed in a three-dimensional basic structure is established. Further, in the above-mentioned method, the application of the crushed products of the gel-like silicon compound onto the resin film results in the formation of the precursor of a porous structure based on the three-dimensional basic structure. In other words, according to the method, a new porous structure (three-dimensional basic structure) different from the three-dimensional structure of the gel-like silicon compound is formed by the application of the pulverized products. Accordingly, in the pore layer to be finally obtained, such a low refractive index that the layer functions to the same extent as, for example, an air layer does may be achieved. Further, in the method, the three-dimensional basic structure is fixed because the pulverized products are chemically bonded to each other. Accordingly, the pore layer to be finally obtained can maintain sufficient strength and sufficient flexibility despite the fact that the layer is a structure having pores.

Further, in the above-mentioned method, the above-mentioned precursor-forming step and the above-mentioned cross-linking reaction step are performed as separate steps. In addition, the cross-linking reaction step is preferably performed in a plurality of stages. In the case where the cross-linking reaction step is performed in a plurality of stages, for example, the strength of the precursor is further improved as compared to that in the case where the cross-linking reaction step is performed in one stage, and hence a low-refractive index layer achieving both of a high porosity and high strength can be obtained. Although a mechanism for the foregoing is unclear, the mechanism is assumed to be, for example, as described below. That is, as described above, an improvement in film strength with a catalyst or the like simultaneous with the formation of the pore layer involves a problem in that the porosity of the layer reduces, though the film strength thereof is improved by the advancement of a catalytic reaction. This is probably because the number of cross-links (chemical bonds) between the microporous particles is increased by, for example, the advancement of a cross-linking reaction between the microporous particles by the catalyst, and hence the bonds therebetween become stronger, but the entirety of the pore layer condenses to reduce the porosity. In contrast, when the precursor-forming step and the cross-linking reaction step are performed as separate steps, and the cross-linking reaction step is performed in a plurality of stages, it is assumed that the number of the cross-links (chemical bonds) can be increased while, for example, the form of the entirety of the precursor is not changed to a very large extent (e.g., the condensation of the entirety is not caused to a very large extent). However, such mechanism is an example of assumable mechanisms, and does not limit the method of forming the low-refractive index layer.

In the precursor-forming step, for example, particles having a uniform shape are laminated to form the precursor of the pore layer. The strength of the precursor at the time point is extremely weak. After that, a product that can chemically bond the microporous particles to each other through, for example, a photoactive or thermally active catalytic reaction (e.g., a strongly basic catalyst generated from a photobase generator) is generated (first stage of the cross-linking reaction step). When heat aging (second stage of the cross-linking reaction step) is further performed in order that the reaction may be advanced efficiently and in a short time period, the chemical bonding (cross-linking reaction) between the microporous particles may be further advanced to improve the strength. For example, when the microporous particles are microporous particles of a silicon compound (e.g., pulverized bodies of a gel-like silica compound), and residual silanol groups (Si—OH groups) are present in the precursor, the residual silanol groups may be chemically bonded to each other by the cross-linking reaction. However, the description is also an example, and does not limit the method of forming the low-refractive index layer.

The above-mentioned method includes the containing liquid-producing step of producing the containing liquid containing the microporous particles. When the microporous particles are the pulverized products of the gel-like compound, the pulverized products are obtained by, for example, pulverizing the gel-like compound. As described above, the three-dimensional structure of the gel-like compound is broken by the pulverization of the gel-like compound to be dispersed in the three-dimensional basic structure. An example of the preparation of the pulverized products is as described below.

The gelation of a monomer compound may be performed by, for example, bonding the molecules of the monomer compound to each other by a hydrogen bond or an intermolecular force. The monomer compound is, for example, a silicon compound represented by the formula (1). The silicon compound represented by the formula (1) has hydroxy groups, and hence the molecules of the monomer represented by the formula (1) may be bonded to each other by a hydrogen bond or an intermolecular force through, for example, their respective hydroxy groups.

Alternatively, the silicon compound may be a hydrolysate of the above-mentioned silicon compound precursor, and may be produced by, for example, hydrolyzing the silicon compound precursor represented by the formula (2).

A method for the hydrolysis of a monomer compound precursor is not particularly limited, and the hydrolysis may be performed by, for example, a chemical reaction in the presence of a catalyst. Examples of the catalyst include acids, such as oxalic acid and acetic acid. The hydrolysis reaction may be performed by, for example, slowly dropping and mixing an aqueous solution of oxalic acid into a mixed liquid (e.g., a suspension) of the silicon compound precursor and dimethyl sulfoxide under a room-temperature environment, and then stirring the mixture as it is for about 30 minutes. At the time of the hydrolysis of the silicon compound precursor, heating and fixation after the gelation, aging, and the formation of the pore structure subsequent to the hydrolysis may be more efficiently performed by, for example, completely hydrolyzing the alkoxy groups of the silicon compound precursor.

The gelation of the monomer compound may be performed by, for example, a dehydration condensation reaction between the molecules of the monomer. For example, the dehydration condensation reaction is preferably performed under the presence of a catalyst, and examples of the catalyst include dehydration condensation catalysts including: acid catalysts, such as hydrochloric acid, oxalic acid, and sulfuric acid; and basic catalysts, such as ammonia, potassium hydroxide, sodium hydroxide, and ammonium hydroxide. A basic catalyst is preferred as the dehydration condensation catalyst. In the dehydration condensation reaction, the amount of the catalyst to be added to the monomer compound is not particularly limited. The catalyst may be added in an amount of, for example, preferably from 0.1 mol to 10 mol, more preferably from 0.05 mol to 7 mol, still more preferably from 0.1 mol to 5 mol with respect to 1 mol of the monomer compound.

For example, the gelation of the monomer compound is preferably performed in a solvent. The ratio of the monomer compound to the solvent is not particularly limited. Examples of the solvent include dimethyl sulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). Those solvents may be used alone or in combination thereof. The solvent to be used for the gelation is hereinafter sometimes referred to as "solvent for gelation."

Conditions for the gelation are not particularly limited. The temperature at which the solvent containing the monomer compound is treated is, for example, from 20° C. to 30° C., preferably from 22° C. to 28° C., more preferably from 24° C. to 26° C. A treatment time is, for example, from 1 minute to 60 minutes, preferably from 5 minutes to 40 minutes, more preferably from 10 minutes to 30 minutes. When the dehydration condensation reaction is performed, treatment conditions therefor are not particularly limited, and those examples may be cited. When the gelation is performed, for example, a siloxane bond grows to form silica primary particles. As the reaction further advances, the primary particles are strung together like beads to produce gel having a three-dimensional structure.

The gel-like compound obtained by the gelation is preferably subjected to aging treatment after the gelation reaction. The aging treatment may further grow, for example, the primary particles of the gel having a three-dimensional structure, which has been obtained by the gelation, to increase the sizes of the particles themselves. As a result, the contact state of a neck portion where the particles are brought into contact with each other can be changed from point contact to surface contact (the area of the contact therebetween can be increased). In the gel subjected to the aging treatment, for example, the strength of the gel itself is improved, and as a result, the strength of the three-dimensional basic structure after the performance of the pulverization of the gel can be improved. Thus, in, for example, the drying step after the application of the pulverized products, the pore size of the pore structure having deposited thereon the three-dimensional basic structure can be suppressed from shrinking along with the volatilization of the solvent in the drying process.

The aging treatment may be performed by, for example, incubating the gel-like compound at a predetermined temperature for a predetermined time period. An aging temperature is, for example, 30° C. or more, preferably 35° C. or more, more preferably 40° C. or more. Meanwhile, the aging temperature is, for example, 80° C. or less, preferably 75° C. or less, more preferably 70° C. or less. The range of the aging temperature is, for example, from 30° C. to 80° C., preferably from 35° C. to 75° C., more preferably from 40° C. to 70° C. An aging time is, for example, 5 hours or more, preferably 10 hours or more, more preferably 15 hours or more. Meanwhile, the aging time is, for example, 50 hours or less, preferably 40 hours or less, more preferably 30 hours or less. The range of the aging time is, for example, from 5 hours to 50 hours, preferably from 10 hours to 40 hours, more preferably from 15 hours to 30 hours. The aging conditions may be optimized so that, for example, an increase in size of each of the silica primary particles and an increase in contact area of the neck portion may be achieved. Further, the boiling point of a solvent to be used is preferably taken into consideration. For example, when the aging temperature is excessively high, the solvent may excessively volatilize to cause an inconvenience such as the closing of the pores of a three-dimensional pore structure due to the condensation of the concentration of a coating liquid (gel liquid). Meanwhile, for example, when the aging temperature is excessively low, an effect exhibited by the aging is not sufficiently obtained, and moreover, the temperature variation of a mass production process for the low-refractive index layer with time increases. Accordingly, a low-refractive index layer poor in characteristics may be formed.

For example, the same solvent as that in the gelation treatment may be used in the aging treatment. Specifically, a reaction product after the gelation treatment (in other words, the solvent containing the gel-like compound) is preferably subjected as it is to the aging treatment. The number of moles of residual silanol groups in the gel (the gel-like compound such as a gel-like silicon compound) that has finished being subjected to the aging treatment after the gelation is, for example, 50% or less, preferably 40% or less, more preferably 30% or less. Meanwhile, the number of moles of the residual silanol groups is, for example, 1% or more, preferably 3% or more, more preferably 5% or more. The range of the number of moles of the residual silanol groups is, for example, from 1% to 50%, preferably from 3% to 40%, more preferably from 5% to 30%. For the purpose of improving the hardness of the gel, for example, the number of moles of the residual silanol groups is preferably as low as possible. When the number of moles of the silanol groups is excessively high, for example, there is a risk in that the pore structure cannot be retained until the precursor of the silicone porous body is cross-linked. Meanwhile, when the number of moles of the silanol groups is excessively low, for example, there is a risk in that the pulverized products of the gel-like compound cannot be cross-linked in the step of producing the microporous particle-containing liquid (e.g., a suspension) and/or any subsequent step, and hence sufficient film strength cannot be imparted to the low-refractive index layer. The number of moles of the residual silanol groups is, for example, the ratio of the residual silanol groups when the number of moles of the alkoxy groups of a raw material (e.g., the monomer compound precursor) is defined as 100. Although the foregoing example concerns a silanol group, for example, when the monomer silicon compound is modified with various reactive functional groups, the same matters, conditions, and the like may be applied to each of the functional groups.

After the monomer compound has been gelled in the solvent for gelation, the resultant gel-like compound is pulverized. In the pulverization, for example, the gel-like compound in the solvent for gelation may be subjected as it is to pulverization treatment. Alternatively, the following may be performed: the solvent for gelation is replaced with any other solvent; and then the gel-like compound in the other solvent is subjected to the pulverization treatment. In addition, for example, when a catalyst used in the gelation reaction and the used solvent remain even after the aging step to cause the gelation of a liquid obtained through the step with time (pot life) and a reduction in drying efficiency at the time of the drying step, the solvent is preferably replaced with the other solvent. The other solvent is hereinafter sometimes referred to as "solvent for pulverization."

The solvent for pulverization is not particularly limited, and for example, an organic solvent may be used. The organic solvent is, for example, a solvent having a boiling point of, for example, 130° C. or less, preferably 100° C. or less, more preferably 85° C. or less. Specific examples thereof include isopropyl alcohol (IPA), ethanol, methanol, butanol, propylene glycol monomethyl ether (PGME), methyl cellosolve, acetone, dimethylformamide (DMF), and isobutyl alcohol. Those solvents for pulverization may be used alone or in combination thereof.

The combination of the solvent for gelation and the solvent for pulverization is not particularly limited, and examples thereof include combinations of DMSO and IPA, of DMSO and ethanol, of DMSO and methanol, of DMSO and butanol, and of DMSO and isobutyl alcohol. When the solvent for gelation is replaced with the solvent for crushing as described above, a more uniform coating film may be formed in, for example, coating film formation to be described later.

A method of pulverizing the gel-like compound is not particularly limited, and the pulverization may be performed with, for example, an ultrasonic homogenizer, a high-speed rotary homogenizer, or any other pulverization apparatus using a cavitation phenomenon. While an apparatus for performing media pulverization such as a ball mill physically breaks the pore structure of the gel at the time of, for example, the pulverization, a pulverization apparatus of a cavitation system such as a homogenizer is, for example, a media-less system, and hence peels a bonded surface between silica particles bonded to each other in a relatively weak manner, which have already been included in a gel three-dimensional structure, with a high-speed shear force. Thus, the gel three-dimensional structure to be obtained may retain, for example, a pore structure having a particle size distribution in a certain range, and hence enables the re-formation of a pore structure by the deposition of the pulverized products at the time of their application and drying. Conditions for the pulverization are not particularly limited, and it is preferred that the gel can be pulverized without the volatilization of the solvent by, for example, momentarily applying a high-speed flow to the pulverized products. For example, the pulverization is preferably performed so that pulverized products having such particle size variation (e.g., a volume-average particle diameter or a particle size distribution) as described above may be obtained. If a workload, such as a pulverization time or strength, is insufficient, there is, for example, a risk in that coarse particles remain in the low-refractive index layer to preclude the formation of dense pores, and moreover, the number of the appearance defects of the layer increases to make it impossible to obtain high quality. Meanwhile, when the workload is excessively large, there is, for example, a risk in that particles having a particle size distribution finer than a desired one are obtained, and hence the pore size of the pore structure deposited after the application and the drying becomes finer to make it impossible to obtain a desired porosity.

Thus, the liquid (e.g., a suspension) containing the microporous particles (pulverized products of the gel-like compound) may be produced. Further, when a catalyst that chemically bonds the microporous particles to each other is added after the production of the liquid containing the microporous particles or during the production step, a containing liquid containing the microporous particles and the catalyst may be produced. The catalyst may be, for example, a catalyst that accelerates cross-linking bonding between the microporous particles. A dehydration condensation reaction between residual silanol groups in silica sol molecules is preferably utilized as a chemical reaction that chemically bonds the microporous particles to each other. The acceleration of the reaction between the hydroxy groups of the silanol groups with the catalyst enables continuous film formation in which the pore structure is cured in a short time period. Examples of the catalyst include a photoactive catalyst and a thermally active catalyst. According to the photoactive catalyst, in, for example, the precursor-forming step, the microporous particles can be chemically bonded (e.g., cross-linking bonded) to each other without heating. In this case, in, for example, the precursor-forming step, the shrinkage of the entirety of the precursor hardly occurs, and hence a higher porosity can be maintained. In addition, a substance that generates a catalyst (catalyst generator) may be used in addition to, or instead of, the catalyst. For example, a substance that generates a catalyst with light (photocatalyst generator) may be used in addition to, or instead of, the photoactive catalyst, and a substance that generates a catalyst with heat (thermal catalyst generator) may be used in addition to, or instead of, the thermally active catalyst. Examples of the photocatalyst generator include a photobase generator (substance that generates a basic catalyst when irradiated with light) and a photoacid generator (substance that generates an acid catalyst when irradiated with light). Of those, a photobase generator is preferred. Examples of the photobase generator include: 9-anthrylmethyl N,N-diethylcarbamate (product name: WPBG-018), (E)-1-[3-(2-hydroxyphenyl)-2-propenoyl]piperidine (product name: WPBG-027), 1-(anthraquinon-2-yl)ethyl imidazolecarboxylate (product name: WPBG-140), 2-nitrophenylmethyl 4-methacryloyloxypiperidine-1-carboxylate (product name: WPBG-165), 1,2-diisopropyl-3-[bis(dimethylamino)methylene]guanidium 2-(3-benzoylphenyl)propionate (product name: WPBG-266), and 1,2-dicyclohexyl-4,4,5,5-tetramethylbiguanidium n-butyltriphenylborate (product name: WPBG-300); 2-(9-oxoxanthen-2-yl)propionic acid 1,5,7-triazabicyclo[4.4.0]dec-5-ene (manufactured by Tokyo Chemical Industry Co., Ltd.); and a compound containing 4-piperidine methanol (product name: HDPD-PB100, manufactured by Heraeus). The product names including "WPBG" are product names of Wako Pure Chemical Industries, Ltd. Examples of the photoacid generator include an aromatic sulfonium salt (product name: SP-170, manufactured by ADEKA Corporation), a triaryl sulfonium salt (product name: CPI101A, manufactured by San-Apro Ltd.), and an aromatic iodonium salt (product name: Irgacure 250, manufactured by Ciba Japan K. K.). In addition, the catalyst that chemically bonds the microporous particles to each other is not limited to the photoactive catalyst and the photocatalyst generator, and may be, for example, a thermally active catalyst or a thermal catalyst generator such as urea. Examples of the catalyst that chemically bonds the microporous particles to each other include: basic catalysts, such as potassium hydroxide, sodium hydroxide, and ammonium hydroxide; and acid catalysts, such as hydrochloric acid, acetic acid, and oxalic acid. Of those, basic catalysts are preferred. The catalyst that chemically bonds the microporous particles to each other or the catalyst generator may be used, for example, as follows: the catalyst or the catalyst generator is added to a sol particle liquid (e.g., a suspension) containing the pulverized products (microporous particles) immediately before its application, and the resultant mixture is used; or the catalyst or the catalyst generator is mixed into a solvent, and the resultant mixed liquid is used. The mixed liquid may be, for example, a coating liquid obtained by directly adding and dissolving the catalyst or the catalyst generator in the sol particle liquid, a solution obtained by dissolving the catalyst or the catalyst generator in the solvent, or a dispersion liquid obtained by dispersing the catalyst or the catalyst generator in the solvent. The solvent is not particularly limited, and examples thereof include water and a buffer solution.

In addition, for example, a cross-linking aid for indirectly bonding the pulverized products of the gel to each other may be further added to the gel-containing liquid. When the cross-linking aid enters a gap between the particles (the pulverized products), and hence the particles and the cross-linking aid interact with, or are bonded to, each other, even the particles distant from each other by some distance can be bonded to each other, and hence the strength of the precursor can be efficiently improved. The cross-linking aid is preferably a multi-cross-linked silane monomer. Specifically, the multi-cross-linked silane monomer has, for example, 2 or more and 3 or less alkoxysilyl groups, may have a chain length of 1 or more and 10 or less carbon atoms between the alkoxysilyl groups, and may contain an element other than carbon. Examples of the cross-linking aid include bis(trimethoxysilyl)ethane, bis(triethoxysilyl)ethane, bis(trimethoxysilyl)methane, bis(triethoxysilyl)methane, bis(triethoxysilyl)propane, bis(trimethoxysilyl)propane, bis(triethoxysilyl)butane, bis(trimethoxysilyl)butane, bis(triethoxysilyl)pentane, bis(trimethoxysilyl)pentane, bis(triethoxysilyl) hexane, bis(trimethoxysilyl) hexane, bis(trimethoxysilyl)-N-butyl-N-propyl-ethane-1,2-diamine, tris-(3-trimethoxysilylpropyl) isocyanurate, and tris-(3-triethoxysilylpropyl) isocyanurate. The addition amount of the cross-linking aid is not particularly limited, but is, for example, from 0.01 wt % to 20 wt %, from 0.05 wt % to 15 wt %, or from 0.1 wt % to 10 wt % with respect to the weight of the pulverized products of the silicon compound.

Next, the containing liquid (e.g., a suspension) containing the microporous particles is applied onto the substrate (applying step). For example, various application systems to be described later may each be used in the application, and a system for the application is not limited thereto. Direct application of the containing liquid containing the microporous particles (e.g., the pulverized products of the gel-like silica compound) onto the substrate may form a coating film containing the microporous particles and the catalyst. The coating film may be referred to as, for example, "coating layer". When the coating film is formed, for example, the pulverized products whose three-dimensional structures have been broken are sedimented and deposited to build a new three-dimensional structure. For example, the containing liquid containing the microporous particles may be free of the catalyst that chemically bonds the microporous particles to each other. For example, as described later, the precursor-forming step may be performed after the catalyst that chemically bonds the microporous particles to each other has been blown onto the coating film, or while the catalyst is blown onto the film. However, the containing liquid containing the microporous particles may contain the catalyst that chemically bonds the microporous particles to each other, and the microporous particles may be chemically bonded to each other through the action of the catalyst in the coating film to form the precursor of the porous body.

The above-mentioned solvent (hereinafter sometimes referred to as "solvent for application") is not particularly limited, and for example, an organic solvent may be used. An example of the organic solvent is a solvent having a boiling point of 150° C. or less. Specific examples thereof include IPA, ethanol, methanol, n-butanol, 2-butanol, isobutyl alcohol, and pentanol. In addition, the same solvent as the solvent for pulverization may be used. When the method of forming the low-refractive index layer includes the step of pulverizing the gel-like compound, in the step of forming the coating film, for example, the solvent for pulverization containing the pulverized products of the gel-like compound may be used as it is.

In the applying step, it is preferred that, for example, sol-like pulverized products dispersed in the solvent (hereinafter sometimes referred to as "sol particle liquid") be applied onto the substrate. When the sol particle liquid is subjected to the chemical cross-linking after having been, for example, applied onto the substrate and dried, a pore layer having a certain level or more of film strength can be continuously formed. The term "sol" as used in the embodiment of the present invention refers to the following state: when the three-dimensional structure of the gel is pulverized, silica sol particles each having a nano three-dimensional structure retaining part of the pore structure are dispersed in the solvent to show fluidity.

The concentration of the pulverized products in the solvent for application is not particularly limited, and is, for example, from 0.3% (v/v) to 50% (v/v), preferably from 0.5% (v/v) to 30% (v/v), more preferably from 1.0% (v/v) to 10% (v/v). When the concentration of the pulverized products is excessively high, for example, the fluidity of the sol particle liquid may remarkably reduce to cause an aggregate or an application stripe at the time of its application. When the concentration of the pulverized products is excessively low, there is, for example, a risk in that the drying of the solvent of the sol particle liquid takes a considerable time period, and moreover, the amount of the residual solvent immediately after the drying increases to reduce the porosity of the pore layer.

The physical properties of the sol are not particularly limited. The shear viscosity of the sol is, for example, 100 cPa·s or less, preferably 10 cPa·s or less, more preferably 1 cPa·s or less at a shear rate of 10,001 s$^{-1}$. When the shear viscosity is excessively high, for example, an application stripe may occur to cause an inconvenience such as a reduction in transfer ratio of gravure coating. In contrast, when the shear viscosity is excessively low, there is, for example, a risk in that the wet coating thickness of the sol at the time of its application cannot be made thick, and hence a desired thickness is not obtained after its drying.

The amount of the pulverized products to be applied to the substrate is not particularly limited, and may be appropriately set in accordance with, for example, a desired thickness of the silicone porous body (consequently, the low-refractive index layer). As a specific example, when a silicone porous body having a thickness of from 0.1 μm to 1,000 μm is formed, the amount of the pulverized products to be applied to the substrate is, for example, from 0.01 μg to 60,000 μg, preferably from 0.1 μg to 5,000 μg, more preferably from 1 μg to 50 μg per 1 m$^2$ of the area of the substrate. It is difficult to uniquely define a preferred application amount of the sol particle liquid because the amount is related to, for example, the concentration and application system of the liquid. However, the liquid is preferably applied so as to be as thin a layer as possible in consideration of productivity. When the application amount is excessively large, for example, the liquid is more likely to be dried in a drying furnace before its solvent volatilizes. Thus, before the nano-pulverized sol particles are sedimented and deposited in the solvent to form the pore structure, the solvent may be dried to inhibit the formation of the pores, thereby largely reducing the porosity of the low-refractive index layer. Meanwhile, when the application amount is excessively small, the following risk may be higher: application repelling occurs owing to, for example, the unevenness of the substrate, or a variation in hydrophilicity or hydrophobicity thereof.

Further, the method of forming the low-refractive index layer includes, for example, the precursor-forming step of forming the pore structure that is the precursor of the pore layer (low-refractive index layer) on the substrate as described above. Although the precursor-forming step is not particularly limited, the precursor (pore structure) may be formed by, for example, the drying step of drying a coating film produced by applying the microporous particle-containing liquid. Through drying treatment in the drying step, for example, the solvent in the coating film (solvent in the sol particle liquid) is removed. In addition, the sol particles can be sedimented and deposited to form the pore structure during the drying treatment. The temperature of the drying treatment is, for example, from 50° C. to 250° C., preferably from 60° C. to 150° C., more preferably from 70° C. to 130° C. The time period of the drying treatment is, for example, from 0.1 minute to 30 minutes, preferably from 0.2 minute to 10 minutes, more preferably from 0.3 minute to 3 minutes. The temperature and time period of the drying treatment are preferably lower and shorter in relation to, for example, continuous productivity and the expression of a high porosity. When the conditions are excessively severe, in, for example, the case where the liquid is applied to the resin film, there is a risk in that the temperature approaches the glass transition temperature of the resin film to elongate the resin film in a drying furnace, and hence a defect such as a crack occurs in the formed pore structure immediately after the application. Meanwhile, when the conditions are excessively mild, the precursor contains the residual solvent at, for example, the timing at which the precursor leaves the drying furnace, and hence an inconvenience in terms of appearance such as the occurrence of a scratch flaw may occur at the time of the rubbing of the precursor with a roll in the next step.

For example, the drying treatment may be natural drying, heat drying, or drying under reduced pressure. Of those, heat drying is preferably used when it is postulated that the optical member is continuously produced on an industrial scale. A method for the heat drying is not particularly limited, and for example, general heating means may be used. Examples of the heating means include a hot-air heater, a heating roll, and a far infrared heater. In addition, the solvent to be used is preferably a solvent having a low surface tension for the purpose of suppressing the occurrence of a shrinkage stress along with the volatilization of the solvent at the time of the drying and the crack phenomenon of the pore layer (silicone porous body) due to the occurrence. Examples of the solvent include lower alcohols typified by isopropyl alcohol (IPA), hexane, and perfluorohexane. In addition, a small amount of a perfluoro-based surfactant or a silicone-based surfactant may be added to IPA or the like described above to reduce its surface tension.

Further, as described above, the method of forming the low-refractive index layer includes the cross-linking reaction step of causing the cross-linking reaction in the precursor after the precursor-forming step, and in the cross-linking reaction step, a basic substance is produced by photoirradiation or heating. In addition, the cross-linking reaction step is performed in a plurality of stages. At the first stage of the cross-linking reaction step, for example, the microporous particles are chemically bonded to each other by the action of the catalyst (basic substance). Thus, for example, the three-dimensional structure of each of the pulverized products in the coating film (precursor) is fixed. When conventional fixation based on sintering is performed, the dehydration condensation of silanol groups in the precursor and the formation of a siloxane bond are induced by performing, for example, high-temperature treatment at 200° C. or more. In the formation method, when various additives that catalyze the dehydration condensation reaction are caused to react with the silanol groups, the pore structure can be continuously formed and fixed at a relatively low drying temperature of around 100° C. and in a short treatment time of less than several minutes without occurrence of damage to, for example, the substrate (resin film).

A method for the chemical bonding is not particularly limited, and may be appropriately determined in accordance with, for example, the kind of the gel-like silicon compound. As a specific example, the chemical bonding may be performed by, for example, chemical cross-linking bonding between the pulverized products. In addition to the foregoing, for example, when inorganic particles, each of which is made of, for example, titanium oxide, and the like are added to the pulverized products, it is conceivable that the inorganic particles and the pulverized products are chemically cross-linking bonded to each other. In addition, even when a biocatalyst such as an enzyme is carried on the substrate, a site of the catalyst different from its catalytic site and the pulverized products may be chemically cross-linking bonded to each other. Accordingly, the development of the application of the method of forming the low-refractive index layer not only to, for example, a pore layer (silicone porous body) formed of sol particles but also to an organic-inorganic hybrid pore layer, a host-guest pore layer, and the like is conceivable.

Which stage in the method of forming the low-refractive index layer the chemical reaction in the presence of the catalyst described above is performed (occurs) at is not particularly limited, and the reaction is performed at, for example, at least one stage in the above-mentioned multistage cross-linking reaction step. For example, in the method of forming the low-refractive index layer, as described above, the drying step may also serve as the precursor-forming step. In addition, for example, the following may be performed: the multistage cross-linking reaction step is performed after the drying step; and the microporous particles are chemically bonded to each other by the action of the catalyst at least one stage of the step. For example, when the catalyst is a photoactive catalyst as described above, in the cross-linking reaction step, the microporous particles may be chemically bonded to each other by photoirradiation to form the precursor of the porous body. In addition, when the catalyst is a thermally active catalyst, in the cross-linking reaction step, the microporous particles may be chemically bonded to each other by heating to form the precursor of the porous body.

The above-mentioned chemical reaction may be performed, for example, by subjecting the coating film containing the catalyst added in advance to the sol particle liquid (e.g., a suspension) to photoirradiation or heating, by blowing the catalyst onto the coating film and then subjecting the coating film to the photoirradiation or the heating, or by subjecting the coating film to the photoirradiation or the heating while blowing the catalyst onto the coating film. An integrated light quantity in the photoirradiation is not particularly limited, and is, for example, from 200 mJ/cm$^2$ to 800 mJ/cm$^2$, preferably from 250 mJ/cm$^2$ to 600 mJ/cm$^2$, more preferably from 300 mJ/cm$^2$ to 400 mJ/cm$^2$ in terms of a wavelength of 360 nm. An integrated light quantity of 200 mJ/cm$^2$ or more is preferred from the viewpoint of preventing the following: an irradiation quantity is not sufficient, and hence the decomposition of the catalyst by its light absorption does not advance, with the result that its effect becomes insufficient. In addition, an integrated light quantity of 800 mJ/cm$^2$ or less is preferred from the viewpoint of preventing the occurrence of a heat wrinkle due to the application of damage to the substrate below the pore layer. Conditions for the heating treatment are not particularly limited. A heating temperature is, for example, from 50° C. to 250° C., preferably from 60° C. to 150° C., more preferably from 70° C. to 130° C. A heating time is, for example, from 0.1 minute to 30 minutes, preferably from 0.2 minute to 10 minutes, more preferably from 0.3 minute to 3 minutes. Alternatively, the step of drying the sol particle liquid (e.g., a suspension) applied as described above may also serve as the step of performing the chemical reaction in the presence of the catalyst. That is, in the step of drying the applied sol particle liquid (e.g., a suspension), the pulverized products (microporous particles) may be chemically bonded to each other by the chemical reaction in the presence of the catalyst. In this case, the pulverized products (microporous particles) may be more strongly bonded to each other by further heating the coating film after the drying step. Further, it is assumed that the chemical reaction in the presence of the catalyst occurs also in the step of producing the microporous particle-containing liquid (e.g., a suspension) and the step of applying the microporous particle-containing liquid in some cases. However, the assumption does not limit the method of forming the low-refractive index layer. In addition, the solvent of the sol particle liquid to be used is preferably a solvent having a low surface tension for the purpose of, for example, suppressing the occurrence of a shrinkage stress along with the volatilization of the solvent at the time of its drying and the crack phenomenon of the pore layer due to the occurrence. Examples of the solvent include lower alcohols typified by isopropyl alcohol (IPA), hexane, and perfluorohexane.

In the method of forming the low-refractive index layer, the cross-linking reaction step is performed in a plurality of stages, and hence the strength of the pore layer (low-refractive index layer) may be further improved as compared to, for example, that in the case where the cross-linking reaction step is performed in one stage. The second and subsequent steps of the cross-linking reaction step are hereinafter sometimes referred to as "aging step." In the aging step, the cross-linking reaction may be further accelerated in the precursor by, for example, heating the precursor. Although a phenomenon occurring in the cross-linking reaction step and a mechanism therefor are unclear, the phenomenon and the mechanism are, for example, as described above. In the aging step, both of a high porosity and high strength may be achieved, for example, as follows: while the shrinkage of the precursor is suppressed by setting a heating temperature to a low temperature, the cross-linking reaction is caused to improve the strength. The temperature in the aging step is, for example, from 40° C. to 70° C., preferably from 45° C. to 65° C., more preferably from 50° C. to 60° C. The time period for which the aging step is performed is, for example, from 10 hr to 30 hr, preferably from 13 hr to 25 hr, more preferably from 15 hr to 20 hr.

The low-refractive index layer formed as described above is excellent in strength, and hence may be turned into, for example, a roll-shaped porous body. Accordingly, the layer has such advantages as described below: the production efficiency of the layer is satisfactory; and the layer is easy to handle.

The low-refractive index layer (pore layer) formed as described above may be provided as, for example, a laminated structural body including a porous structure by being further laminated together with any other film (layer). In this case, the respective constituents in the laminated structural body may be laminated via, for example, a pressure-sensitive adhesive or an adhesive. For example, the respective constituents may be laminated by continuous treatment including using an elongated film (e.g., a so-called roll-to-roll process) because the lamination can be efficiently performed. When the substrate is, for example, a molded product or an element, the constituents subjected to batch treatment may be laminated.

Details about specific configurations of the low-refractive index layer and the method of forming the low-refractive index layer are described in, for example, WO 2019/151073 A1, the description of which is incorporated herein by reference.

B-4. First Pressure-Sensitive Adhesive Layer

The first pressure-sensitive adhesive layer has such hardness that under a normal state, a pressure-sensitive adhesive for forming the first pressure-sensitive adhesive layer does not permeate the pores of the low-refractive index layer. The storage modulus of elasticity of the first pressure-sensitive adhesive layer at 23° C. is from $1.0 \times 10^5$ (Pa) to $1.0 \times 10^7$ (Pa) as described above. The storage modulus of elasticity is, for example, $1.1 \times 10^5$ (Pa) or more, $1.2 \times 10^5$ (Pa) or more, $1.3 \times 10^5$ (Pa) or more, $1.4 \times 10^5$ (Pa) or more, $1.5 \times 10^5$ (Pa) or more, $1.6 \times 10^5$ (Pa) or more, $1.7 \times 10^5$ (Pa) or more, $1.8 \times 10^5$ (Pa) or more, $1.9 \times 10^5$ (Pa) or more, or $2.0 \times 10^5$ (Pa) or more, and $1.0 \times 10^7$ (Pa) or less, $5.0 \times 10^5$ (Pa) or less, $1.0 \times 10^6$ (Pa) or less, or $5.0 \times 10^5$ (Pa) or less. The storage modulus of elasticity is preferably from $1.3 \times 10^5$ (Pa) to $1.0 \times 10^6$ (Pa), more preferably from $1.5 \times 10^5$ (Pa) to $5.0 \times 10^5$ (Pa). The storage modulus of elasticity is determined by reading a value at 23° C. at the time of measurement in conformity with a method described in JIS K 7244-1 "Plastics-Determination of dynamic mechanical properties" under the condition of a frequency of 1 Hz in the range of from −50° C. to 150° C. at a rate of temperature increase of 5° C./min.

Any appropriate pressure-sensitive adhesive may be used as the pressure-sensitive adhesive for forming the first pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition typically contains a (meth)acrylic polymer as a main component (base polymer). The (meth)acrylic polymer may be incorporated into the pressure-sensitive adhesive composition at a ratio of, for example, 50 wt % or more, preferably 70 wt % or more, more preferably 90 wt % or more in the solid content of the pressure-sensitive adhesive composition. The (meth)acrylic polymer contains, as a main component, an alkyl (meth)acrylate serving as a monomer unit. The term "(meth)acrylate" refers to an acrylate and/or a methacrylate. The alkyl group of the alkyl (meth)acrylate is, for example, a linear or branched alkyl group having 1 to 18 carbon atoms. The average number of carbon atoms of the alkyl group is preferably from 3 to 9. As a monomer for forming the (meth)acrylic polymer, in addition to the alkyl (meth)acrylate, there are given comonomers, such as a carboxyl group-containing monomer, a hydroxyl group-containing monomer, an amide group-containing monomer, an aromatic ring-containing (meth)acrylate, and a heterocycle-containing (meth)acrylate. The comonomer is preferably a hydroxyl group-containing monomer and/or a heterocycle-containing (meth)acrylate, more preferably N-acryloylmorpholine. The acrylic pressure-sensitive adhesive composition may preferably contain a silane coupling agent and/or a cross-linking agent. The silane coupling agent is, for example, an epoxy group-containing silane coupling agent. The cross-linking agent is, for example, an isocyanate-based cross-linking agent or a peroxide-based cross-linking agent. Details about such pressure-sensitive adhesive layer or acrylic pressure-sensitive adhesive composition are described in, for example, JP 4140736 B2, the description of which is incorporated herein by reference.

The thickness of the first pressure-sensitive adhesive layer is preferably from 3 μm to 30 μm, more preferably from 5 μm to 10 μm. When the thickness of the first pressure-sensitive adhesive layer falls within such ranges, the following advantage is obtained: an influence of the thickness of the pressure-sensitive adhesive layer on the entire thickness of the optical member is small while the layer has a sufficient adhesive strength. Further, the above-mentioned desired thickness ratio can be easily achieved.

B-5. Second Pressure-Sensitive Adhesive Layer

The second pressure-sensitive adhesive layer is applied to an apparatus that may continuously vibrate at the time of its use, such as a vehicle, and the layer includes a pressure-sensitive adhesive having such softness as to be capable of absorbing the transfer of the vibration to suppress the breakage of the low-refractive index layer. The storage modulus of elasticity of the second pressure-sensitive adhesive layer at 23° C. is, for example, $1.0 \times 10^5$ (Pa) or less as described above, and is, for example, $1.0 \times 10^5$ (Pa) or less, $9.5 \times 10^4$ (Pa) or less, $9.0 \times 10^4$ (Pa) or less, $8.5 \times 10^4$ (Pa) or less, $8.0 \times 10^4$ (Pa) or less, $7.5 \times 10^4$ (Pa) or less, or $7.0 \times 10^4$ (Pa) or less, and $1.0 \times 10^3$ (Pa) or more, $5.0 \times 10^3$ (Pa) or more, $1.0 \times 10^4$ (Pa) or more, or $5.0 \times 10^4$ (Pa) or more. The storage modulus of elasticity is preferably from $5.0 \times 10^3$ (Pa) to $9.0 \times 10^4$ (Pa), more preferably from $1.0 \times 10^4$ (Pa) to $8.5 \times 10^4$ (Pa).

Any appropriate pressure-sensitive adhesive may be used as the pressure-sensitive adhesive for forming the second pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition is as described in the section B-4. However, the pressure-sensitive adhesive for forming the second pressure-sensitive adhesive layer is preferably free of a heterocycle-containing (meth)acrylate as a comonomer. In addition, the weight-average molecular weight Mw of a base polymer in the pressure-sensitive adhesive composition is preferably 2,000,000 or less, more preferably from 5,000 to 1,600,000. Details about the second pressure-sensitive adhesive layer or the acrylic pressure-sensitive adhesive composition for forming the second pressure-sensitive adhesive layer are described in, for example, JP 2016-190996 A, the description of which is incorporated herein by reference.

The thickness of the second pressure-sensitive adhesive layer is preferably from 5 μm to 300 μm, more preferably from 10 μm to 200 μm. When the thickness of the second pressure-sensitive adhesive layer falls within such ranges, impact is alleviated particularly at the time of the vibration of the optical member in a lateral direction, and hence damage to the low-refractive index layer can be reduced. In addition, strain in a configuration occurring at the time of the assembly of an image display apparatus is reduced, and as a result, brightness unevenness at the time of image display can be reduced. Further, the above-mentioned desired thickness ratio can be easily achieved.

C. Surface-Treated Layer

The dynamic friction coefficient of the surface-treated layer is preferably 1.0 or less, more preferably 0.8 or less, still more preferably 0.5 or less. The dynamic friction coefficient of the surface-treated layer is preferably as small as possible, and the lower limit thereof may be, for example, 0.1. When the dynamic friction coefficient falls within such ranges, a reduction in display quality due to wear or a flaw between the light guide plate and the reflective plate, and/or wear or a flaw between the light guide plate and a casing resulting from vibration at the time of the use of the optical member can be suppressed. That is, when the surface-treated layer is arranged as an outermost layer to make the optical member slippery, the wear or the flaw (between the light guide plate and the reflective plate, and/or between the light guide plate and the casing) at the time of the vibration can be significantly suppressed. As a result, the reduction in display quality (substantially, display quality of the image display apparatus) can be suppressed. Further, the breakage of the low-refractive index layer due to the vibration can be suppressed by a synergistic effect of the arrangement of such surface-treated layer and the setting of the storage modulus of elasticity of the second pressure-sensitive adhesive layer described above within a predetermined range. The dynamic friction coefficient may be measured on the basis of JIS K 7125 "Determination of the coefficients of friction."

Any appropriate configuration may be adopted for the surface-treated layer as long as the layer can be formed on the surface of the reflective plate, and has such dynamic friction coefficient as described above. In one embodiment, the surface-treated layer may be a hard coat layer. The hard coat layer has a pencil hardness of preferably H or more, more preferably 2H or more, still more preferably 3H or more. Meanwhile, the pencil hardness of the hard coat layer is preferably 6H or less, more preferably 5H or less. When the pencil hardness of the hard coat layer falls within such ranges, the breakage of the low-refractive index layer can be suppressed while a reduction in display quality due to wear or a flaw resulting from the vibration of the optical member is suppressed. The pencil hardness may be measured on the basis of JIS K 5400 "Pencil hardness test."

The thickness of the hard coat layer is preferably from 1 μm to 30 μm, more preferably from 2 μm to 20 μm, still more preferably from 3 μm to 15 μm. When the thickness of the hard coat layer falls within such ranges, the wear or the flaw can be more satisfactorily suppressed. In addition, the layer can be suppressed from causing interference fringes while having such hard pencil hardness as described above.

The hard coat layer may include any appropriate material as long as the layer satisfies such characteristics as described above. The hard coat layer is, for example, a cured layer of a thermosetting resin or a resin curable with an ionizing radiation (e.g., visible light or UV light). Examples of such curable resin include: acrylates, such as urethane (meth) acrylate, polyester (meth)acrylate, and epoxy (meth)acrylate; silicon resins such as a siloxane; unsaturated polyester; and an epoxy.

Details about the hard coat layer are described in, for example, JP 2011-237789 A, the description of which is incorporated herein by reference.

In one embodiment, the surface-treated layer may further include an outermost layer containing fluorine on the surface of the hard coat layer opposite to the reflective plate. The formation of such outermost layer can further reduce the dynamic friction coefficient of the surface-treated layer. The outermost layer may be formed by, for example, applying a coating liquid containing a fluorine resin (e.g., polytetrafluoroethylene), and drying, solidifying, or baking and curing the liquid. The thickness of the outermost layer is preferably from 0.5 μm to 20.0 μm.

D. Backlight Unit

Figure 2:
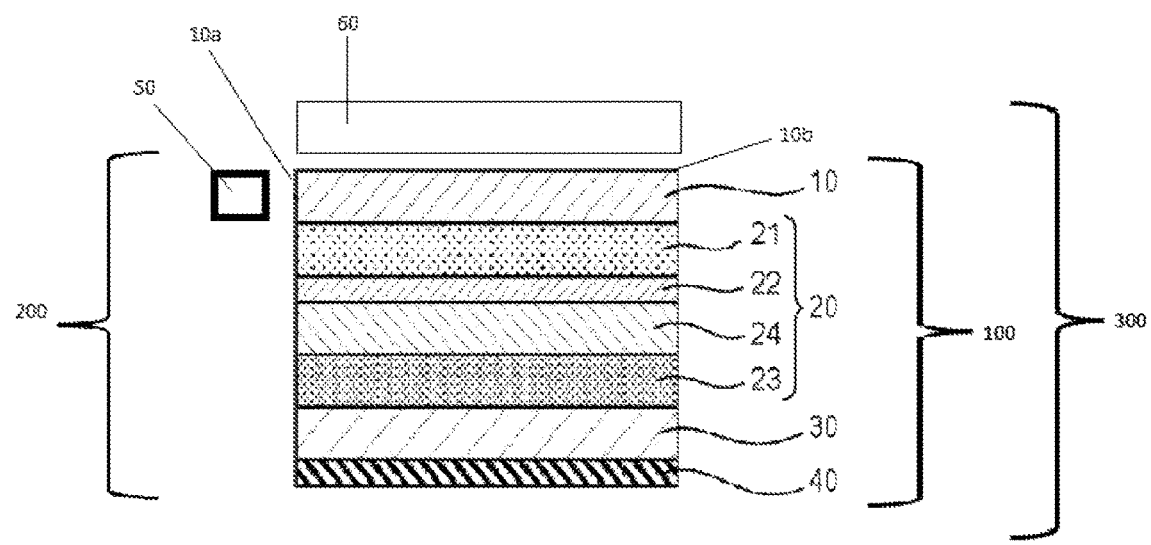
FIG. 2 is a schematic sectional view of image display apparatus according to one embodiment of the present invention.

The optical member described in the section A to the section C may be suitably used in a backlight unit 200 (in particular, an edge light-type backlight unit). Accordingly, the embodiment of the present invention also encompasses such backlight unit 200. As illustrated in FIG. 2, the backlight unit 200 includes the optical member described in the section A to the section C and a light source 50. The light source 50 may be, for example, a LED light source or an organic EL light source. The light source 50 is arranged so as to face the end surface 10a of the light guide plate 10 of FIG. 2.

E. Image Display Apparatus

The backlight unit 200 of the section D may be suitably used in an image display apparatus 300 (e.g., a liquid crystal display). Accordingly, the embodiment of the present invention also encompasses such image display apparatus 300. As illustrated in FIG. 2, the image display apparatus 300 includes the backlight unit 200 described in the section D and an image display panel 60 arranged on the emitting surface 10b side of the light guide plate of the unit.

EXAMPLES

Now, the present invention is specifically described by way of Examples. However, the present invention is not limited to these Examples. Measurement methods for characteristics are as described below. In addition, unless otherwise specified, "%" and "part(s)" in Examples are by weight.

Production Example 1 Preparation of Coating Liquid for Forming Low-Refractive Index Layer (1) Gelation of Silicon Compound 0.95 g of methyltrimethoxysilane (MTMS) that was a precursor of a silicon compound was dissolved in 2.2 g of dimethyl sulfoxide (DMSO). Thus, a mixed liquid A was prepared. 0.5 g of a 0.01 mol/L aqueous solution of oxalic acid was added to the mixed liquid A, and the mixture was stirred at room temperature for 30 minutes so that MTMS was hydrolyzed. Thus, a mixed liquid B containing tris (hydroxy)methylsilane was produced.

0.38 g of 28 wt % ammonia water and 0.2 g of pure water were added to 5.5 g of DMSO, and then the mixed liquid B was further added to the mixture, followed by stirring at room temperature for 15 minutes to perform the gelation of tris(hydroxy)methylsilane. Thus, a mixed liquid C containing a gel-like silicon compound was obtained.

(2) Aging Treatment

Aging treatment was performed by incubating the mixed liquid C containing the gel-like silicon compound, which had been prepared as described above, as it was at 40° C. for 20 hours.

(3) Pulverization Treatment

Next, the gel-like silicon compound subjected to the aging treatment as described above was crushed into granular shapes each having a size of from several millimeters to several centimeters with a spatula. Next, 40 g of isopropyl alcohol (IPA) was added to the mixed liquid C, and the mixture was lightly stirred. After that, the mixture was left at rest at room temperature for 6 hours so that the solvent and the catalyst in the gel were decanted. Similar decantation treatment was performed three times to replace the solvent with IPA. Thus, a mixed liquid D was obtained. Next, the gel-like silicon compound in the mixed liquid D was subjected to pulverization treatment (high-pressure media-less pulverization). The pulverization treatment (high-pressure media-less pulverization) was performed as follows: a homogenizer (manufactured by SMT Co., Ltd., product name: "UH-50") was used, and 1.85 g of the gel-like silicon compound and 1.15 g of IPA in the mixed liquid D were weighed in a 5-cubic centimeter screw bottle, followed by the performance of the pulverization of the mixture under the conditions of 50 W and 20 kHz for 2 minutes.

The gel-like silicon compound in the mixed liquid D was pulverized by the pulverization treatment, and hence the mixed liquid was turned into a sol liquid of the pulverized products (a mixed liquid D'). A volume-average particle diameter representing a variation in particle size of the pulverized products in the mixed liquid D' was determined to be from 0.50 to 0.70 with a dynamic light scattering-type nanotrack particle size analyzer (manufactured by Nikkiso Co., Ltd., UPA-EX150). Further, a methyl ethyl ketone (MEK) solution of a photobase generator (Wako Pure Chemical Industries, Ltd.: product name: WPBG-266) having a concentration of 1.5 wt % and a MEK solution of bis(trimethoxysilyl) ethane having a concentration of 5% were added at ratios of 0.062 g and 0.036 g, respectively to 0.75 g of the sol liquid (mixed liquid D'). Thus, a coating liquid for forming a low-refractive index layer was obtained.

Production Example 2

Preparation of Pressure-Sensitive Adhesive for Forming First Pressure-Sensitive Adhesive Layer 90.7 Parts of butyl acrylate, 6 parts of N-acryloylmorpholine, 3 parts of acrylic acid, 0.3 part of 2-hydroxybutyl acrylate, and 0.1 part by weight of 2,2'-azobisisobutyronitrile serving as a polymerization initiator were loaded into a four-necked flask including a stirring blade, a temperature gauge, a nitrogen gas-introducing tube, and a condenser together with 100 g of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.2 Part of an isocyanate cross-linking agent (CORONATE L manufactured by Nippon Polyurethane Industry Co., Ltd., tolylene diisocyanate adduct of trimethylolpropane), 0.3 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive solution. Next, the acrylic pressure-sensitive adhesive solution was applied to one surface of a silicone-treated polyethylene terephthalate (PET) film (manufactured by Mitsubishi Chemical Polyester Film Co., Ltd., thickness: 38 µm) so that the thickness of a pressure-sensitive adhesive layer after drying became 20 µm, followed by drying at 150° C. for 3 minutes. Thus, the pressure-sensitive adhesive layer was formed. The resultant pressure-sensitive adhesive layer had a storage modulus of elasticity of $1.3 \times 10^5$ (Pa).

Production Example 3

Preparation of Pressure-Sensitive Adhesive for Forming Second Pressure-Sensitive Adhesive Layer 99 Parts of butyl acrylate, 1 part of 4-hydroxybutyl acrylate, and 0.1 part of 2,2'-azobisisobutyronitrile serving as a polymerization initiator were loaded into a four-necked flask including a stirring blade, a temperature gauge, a nitrogen gas-introducing tube, and a condenser together with 100 parts of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.1 Part of an isocyanate cross-linking agent (TAKENATE D110N manufactured by Mitsui Takeda Chemicals Inc., trimethylolpropane xylylene diisocyanate), 0.1 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive composition solution. Next, the acrylic pressure-sensitive adhesive composition solution was applied to one surface of a polyethylene terephthalate film treated with a silicone-based releasing agent (separator film: manufactured by Mitsubishi Chemical Polyester Film Co., Ltd., MRF 38), and was dried at 150° C. for 3 minutes to form a pressure-sensitive adhesive layer having a thickness of 20 µm on the surface of the separator film. The resultant pressure-sensitive adhesive layer had a storage modulus of elasticity of $8.2 \times 10^4$ (Pa).

Production Example 4 Production of Double-Sided Pressure-Sensitive Adhesive Film The coating liquid for forming a low-refractive index layer prepared in Production Example 1 was applied to a substrate having a thickness of 20 µm (acrylic film). The wet thickness (thickness before drying) of the coating layer was about 27 µm. The coating layer was treated at a temperature of 100° C. for 1 minute to be dried. Thus, a low-refractive index layer (thickness: 0.9 µm) was formed on the substrate. The resultant low-refractive index layer had a porosity of 56% and a refractive index of 1.15. Next, a first pressure-sensitive adhesive layer (thickness: 10 µm) including the pressure-sensitive adhesive prepared in Production Example 2 was formed on the surface of the low-refractive index layer. Further, a second pressure-sensitive adhesive layer (thickness: 28 µm) including the pressure-sensitive adhesive prepared in Production Example 3 was formed on the surface of the substrate. Thus, a double-sided pressure-sensitive adhesive film, which had the configuration "first pressure-sensitive adhesive layer (high storage modulus of elasticity)/low-refractive index layer/substrate/second pressure-sensitive adhesive layer (low storage modulus of elasticity)," was produced. The ratio of the thickness of the low-refractive index layer to the total thickness of the pressure-sensitive adhesive layers was 1.5%. The refractive index of the low-refractive index layer was measured as described below.

After the low-refractive index layer had been formed on the acrylic film, the resultant was cut into a size measuring 50 mm by 50 mm, and the piece was bonded to the front surface of a glass plate (thickness: 3 mm) via a pressure-sensitive adhesive layer. A central portion (having a diameter of about 20 mm) on the rear surface of the glass plate was daubed with a black marker pen. Thus, a sample in which light was not reflected on the rear surface of the glass plate was obtained. The sample was set in an ellipsometer (manufactured by J. A. Woollam Japan: VASE), and its refractive index was measured under the conditions of a wavelength of 550 nm and an incident angle of from 50° to 80°.

Production Example 5 Preparation of Hard Coat Layer-Forming Material

To a resin solution (manufactured by DIC Corporation, product name: "UNIDIC 17-806", solid content concentration: 80%) obtained by dissolving, in butyl acetate, a UV-curable resin monomer or oligomer containing urethane acrylate as a main component, 5 parts of a photopolymerization initiator (manufactured by BASF SE, product name: "IRGACURE 906") and 0.03 part of a leveling agent (manufactured by DIC Corporation, product name: "GRANDIC PC4100") per 100 parts of the solid content in the solution were added. After that, butyl acetate was added to the solution so that the solid content concentration in the solution became 75%. Further, cyclopentanone was added to the solution so that the solid content concentration in the solution became 50%. Thus, a hard coat layer-forming material for forming a hard coat layer was prepared.

Example 1

The hard coat layer-forming material obtained in Production Example 5 was applied to one surface of a reflective plate (manufactured by Toray Industries, Inc., product name: "LUMIRROR (trademark) #225 E6SR") with a die coater to form a coating film. The hard coat layer-forming material was applied in a thickness of 13.8 μm so that the thickness of the coating film after its curing (hard coat layer) became 7.5 μm. The coating film was dried at 80° C. for 2 minutes, and then the coating film was irradiated with UV light having an integrated light quantity of 300 mJ/cm$^2$ through use of a high-pressure mercury lamp. Thus, a hard coat layer was formed. The hard coat layer had a dynamic friction coefficient of 0.8 and a pencil hardness of 2H. The surface of the reflective plate on which the hard coat layer was not formed and the double-sided pressure-sensitive adhesive film obtained in Production Example 4 were bonded to each other via the second pressure-sensitive adhesive layer. Further, a commercial light guide plate was bonded to the resultant via the first pressure-sensitive adhesive layer. Thus, an optical member was produced. The dynamic friction coefficient was measured on the basis of JIS K 7125 "Determination of the coefficients of friction," and the pencil hardness was measured on the basis of JIS K 5400 "Pencil hardness test."

(I) Flaw Test

The laminate of the double-sided pressure-sensitive adhesive film and the reflective plate used in the optical member was subjected to a flaw test. A specific procedure is as described below. The laminate was cut into a size measuring 50 mm by 1,500 mm, and was bonded to a glass plate via the first pressure-sensitive adhesive layer to produce a test sample. Next, the test sample and a diffusing sheet (manufactured by Sumitomo 3M Limited, product name: "DBEF-D2-400") were arranged in a tray so that the reflective plate (substantially, the hard coat layer) of the sample and the sheet were brought into contact with each other, followed by a vibration test at 200 times/min for 10 minutes. A flaw in the reflective plate after the vibration test was visually observed, and was evaluated by the following criteria. The result is shown in Table 1.
Satisfactory: No flaw was observed on the surface of the reflective plate.
Unsatisfactory: A flaw was observed on the surface of the reflective plate.

(II) Reworkability

The resultant optical member was arranged in the back surface-side casing of a liquid crystal display apparatus, and was then removed. The member was arranged in the back surface-side casing again, and was evaluated by the following criteria. The result is shown in Table 1.
Satisfactory: The member was able to be rearranged.
Unsatisfactory: The member could not be rearranged (the laminate broke).

Example 2

An optical member was produced in the same manner as in Example 1 except that a fluorine coating layer was formed as an outermost layer containing fluorine on the surface of the hard coat layer. The fluorine coating layer was formed by using a commercial fluorine resin coating spray (manufactured by Taihei Kasei Co., Ltd., product name: "JET PROTECTOR F-200SI"). The fluorine coating layer had a thickness of 15 μm and a dynamic friction coefficient of 0.4. The resultant optical member was subjected to the same evaluations as those of Example 1. The results are shown in Table 1.

Comparative Example 1

An optical member was produced in the same manner as in Example 1 except that no hard coat layer was formed. The surface of the reflective plate had a dynamic friction coefficient of 1.1. The resultant optical member was subjected to the same evaluations as those of Example 1. The results are shown in Table 1.

Comparative Example 2

The surface of the reflective plate of the optical member of Comparative Example 1 was bonded to the back surface-side casing of a liquid crystal display apparatus with a commercial double-sided tape, and was then peeled. The surface was arranged in (bonded to) the back surface-side casing again, and was evaluated by the same criteria as those of Example 1. The result is shown in Table 1.

TABLE 1

| | Dynamic friction coefficient | Flaw test | Reworkability |
| --- | --- | --- | --- |
| Example 1 | 0.8 | Satisfactory | Satisfactory |
| Example 2 | 0.4 | Satisfactory | Satisfactory |
| Comparative Example 1 | 1.1 | Unsatisfactory | Satisfactory |
| Comparative Example 2 | — | — | Unsatisfactory |

As is apparent from Table 1, according to Examples of the present invention, an optical member suppressed from causing a flaw due to vibration can be achieved. It is understood that such optical member is suppressed from causing a reduction in display quality due to a flaw or wear. Further, it is found that according to Examples of the present invention, the low-refractive index layer is not broken even by the vibration.

INDUSTRIAL APPLICABILITY

The optical member of the present invention may be suitably used in the backlight unit of an image display apparatus (in particular, a liquid crystal display apparatus). The image display apparatus may be suitably used in on-vehicle applications and/or amusement applications.

REFERENCE SIGNS LIST 10 light guide plate
20 double-sided pressure-sensitive adhesive film
21 first pressure-sensitive adhesive layer
22 low-refractive index layer
23 second pressure-sensitive adhesive layer
24 substrate
30 reflective plate
40 surface-treated layer
100 optical member
50 light source
200 backlight unit
60 image display panel
300 image display apparatus

The invention claimed is:

1. An optical member, comprising:
   a light guide plate having an end surface that light from a light source enters and an emitting surface from which the entered light is emitted; and
   a reflective plate bonded to a side of the light guide plate opposite to the emitting surface via a double-sided pressure-sensitive adhesive film,
   wherein the double-sided pressure-sensitive adhesive film includes a first pressure-sensitive adhesive layer, a low-refractive index layer, and a second pressure-sensitive adhesive layer from a light guide plate side,
   wherein the optical member further comprises a surface-treated layer formed on a side of the reflective plate opposite to the double-sided pressure-sensitive adhesive film, and
   the first pressure-sensitive adhesive layer has a storage modulus of elasticity of $1.2 \times 10^5$ (Pa) or more and the second pressure-sensitive adhesive layer has a storage modulus of elasticity of $9.0 \times 10^4$ (Pa) or less.

2. The optical member according to claim 1, wherein the surface-treated layer has a dynamic friction coefficient of 1.0 or less.

3. The optical member according to claim 1, wherein the surface-treated layer is a hard coat layer having a pencil hardness of H or more.

4. The optical member according to claim 3, wherein the surface-treated layer further includes an outermost layer containing fluorine on a surface of the hard coat layer opposite to the reflective plate.

5. A backlight unit, comprising:
   the optical member of claim 1; and
   a light source,
   wherein the light source is arranged so as to face the end surface of the light guide plate.

6. An image display apparatus, comprising:
   the backlight unit of claim 5; and
   an image display panel arranged on an emitting surface side of the light guide plate.

7. The backlight unit according to claim 1, wherein the low-refractive index layer has pores therein and the porosity of the low-refractive index layer is 40% or more and 85% or less.

8. The backlight unit according to claim 1, wherein a size of each of the pores in the low-refractive index layer is from 2 nm to 500 nm.

9. The backlight unit according to claim 1, wherein the low-refractive index layer has a refractive index of 1.30 or less.

10. The backlight unit according to claim 1, wherein the low-refractive index layer has a haze of less than 5%.

11. The backlight unit according to claim 1, wherein the low-refractive index layer has a thickness of from 0.2 μm to 5μm.

12. The backlight unit according to claim 1, wherein the low-refractive index layer is formed of one or a plurality of kinds of constituent units each forming a fine pore structure, and the constituent units are chemically bonded to each other through a catalytic action.

13. The backlight unit according to claim 1, wherein the first pressure-sensitive adhesive layer is adjacent to the low-refractive index layer and has a storage modulus of elasticity of from $1.3 \times 10^5$ (Pa) to $1.0 \times 10^6$ (Pa).

14. The backlight unit according to claim 1, wherein the second pressure-sensitive adhesive layer has a storage modulus of elasticity of from $5.0 \times 10^3$ (Pa) to $9.0 \times 10^4$ (Pa).

15. An optical member, comprising:
   a light guide plate having an end surface that light from a light source enters and an emitting surface from which the entered light is emitted; and
   a reflective plate bonded to a side of the light guide plate opposite to the emitting surface via a double-sided pressure-sensitive adhesive film,
   wherein the double-sided pressure-sensitive adhesive film includes a first pressure-sensitive adhesive layer, a low-refractive index layer, and a second pressure-sensitive adhesive layer from a light guide plate side,
   wherein the optical member further comprises a surface-treated layer formed on a side of the reflective plate opposite to the double-sided pressure-sensitive adhesive film,
   wherein the surface-treated layer has a dynamic friction coefficient of 1.0 or less,
   wherein the low-refractive index layer is formed of one or a plurality of kinds of constituent units each forming a fine pore structure, and the constituent units are chemically bonded to each other through a catalytic action,
   wherein the low-refractive index layer has pores therein and the porosity of the low-refractive index layer is 40% or more and 85% or less,
   wherein a size of each of the pores in the low-refractive index layer is from 2 nm to 500 nm,
   wherein the low-refractive index layer has a refractive index of 1.30 or less, has a haze of less than 5%, and has a thickness of from 0.2 μm to 5 μm,
   wherein the first pressure-sensitive adhesive layer is adjacent to the low-refractive index layer and has a storage modulus of elasticity of from $1.3 \times 10^5$ (Pa) to $1.0 \times 10^6$ (Pa), and
   wherein the second pressure-sensitive adhesive layer has a storage modulus of elasticity of from $5.0 \times 10^3$ (Pa) to $9.0 \times 10^4$ (Pa).

* * * * *